United States Patent [19]

Priem et al.

[11] Patent Number: 4,685,510
[45] Date of Patent: Aug. 11, 1987

[54] PULSE COMBUSTION ENGINE AND HEAT TRANSFER SYSTEM

[75] Inventors: Richard J. Priem, Middleburg Heights; M. Reza Ghassemzadeh, Cleveland; James C. Griffiths, Lyndhurst, all of Ohio

[73] Assignee: American Gas Association, Cleveland, Ohio

[21] Appl. No.: 855,809

[22] Filed: Apr. 24, 1986

[51] Int. Cl.[4] .......................................... F25B 27/00
[52] U.S. Cl. ...................... 165/62; 62/323.1; 417/364; 417/380; 417/381; 417/386
[58] Field of Search ................ 62/323.1; 165/62; 417/380, 381, 364, 386; 60/595

[56] References Cited

U.S. PATENT DOCUMENTS

| | | | |
|---|---|---|---|
| 2,545,861 | 3/1951 | Sallou | 62/323.1 |
| 3,024,591 | 3/1962 | Ehrat et al. | 60/595 |
| 3,139,924 | 7/1964 | Schreiner | 62/323.1 |
| 3,805,540 | 4/1974 | Schwartzman | 62/323.3 |

Primary Examiner—Albert W. Davis, Jr.
Attorney, Agent, or Firm—Pearne, Gordon, McCoy & Granger

[57] ABSTRACT

A pulse combustion powered apparatus is disclosed for temperature conditioning and pressurizing fluids. The alternating periods of positive and negative pressure of the combustion gases of a pulse combustion burner drive a reciprocating compressor and the rejected engine heat is recovered by heat exchange with a primary fluid. The compressor may be included in a reversible refrigeration circuit to provide heating and cooling of secondary fluids.

16 Claims, 4 Drawing Figures

PULSE COMBUSTION ENGINE AND HEAT TRANSFER SYSTEM

BACKGROUND AND SUMMARY OF THE INVENTION

This invention relates generally to pulse combustion, and more particularly to the provision of a pulse combustion heat engine for temperature conditioning and pressurizing fluids. In an illustrated application, a pulse combustion heat engine is used to drive a reciprocating compressor in a reversible refrigeration system for heating and cooling fluids.

It is known to use internal combustion engines to drive free piston compressor devices as shown in U.S. Pat. Nos. 1,657,641 and 3,986,796. These arrangements are characterized by multiple valving functions and apparatus, since the piston provides both an engine function and a fluid compression function. The piston is returned after each compression stroke by the energy stored in the fluid of a "bounce" cylinder of a mechanical device such as a spring. Each of these patents also discloses the use of reservoirs of pressurized fluid as a starting fluid chamber to initially begin piston movement at start-up.

It is also known to use internal combustion engines to drive two independent compressors or compressed air sources as taught in U.S. Pat. No. 4,205,638. A power piston drives a pair of pistons mounted within angularly intersecting cylinders respectively using a working fluid and a mechanical connection. One of the pistons is used to provide a source of compressed air for injection into the combustion chamber of the engine.

In contrast with the foregoing prior art devices and techniques, applicants are not aware of the prior use of pulse combustion to drive a reciprocating or oscillating element for pressurizing a fluid, nor the use of a pulse combustion heat engine to power a compressor combined with the recovery of the engine-rejected heat. The use of the alternating pressures of the combustion gases in a pulse combustion system to both drive a reciprocating element and generate an oscillating flow field to enhance heat transfer provides efficiency improvements not previously achieved in the art.

In accordance with the invention, the pulse combustion heat engine is arranged to power a reversible refrigeration system or device and the engine-rejected heat is recovered in a primary heat exchanger. The reversible refrigeration system transfers heat energy between first and second secondary fluids which will typically comprise outdoor air and inside air which is to be conditioned.

The reversible refrigeration system, which may comprise a heat pump, includes a reciprocating compressor having a piston driven by the combustion gases of the heat engine. In most cases, the major portion of the pulse combustion energy is used in the primary heat exchanger, and generally no more than about 20% of the total energy is used for mechanical work. Virtually all of the heat energy not used to provide mechanical work is transferred in the primary heat exchanger due to the highly efficient heat transfer characteristics of pulse combustion associated with the relatively high turbulence and cyclic flow reversal of the combustion gases.

The pulse combustion process and technology of interest here are widely used in heating applications, such as water heaters, with combustion of natural gas or other gaseous fuels, as well as liquid fuels. In pulse combustion burners of the Helmholtz type, a combustion chamber of a given size is connected to an exhaust or tailpipe of given length having a cross section somewhat less than that of the combustion chamber. The tailpipe may be connected to an enlarged volume decoupler prior to venting the gases. The burner is designed to operate in a resonant manner at or near its natural frequency, as primarily determined by the geometry of the combustion chamber, tailpipe, and decoupler, if used, in accordance with the Helmholtz equation. The operating pressure is characterized by a sinusoidal curve. An oscillating or pulsatile flow of combustion gases through the burner is maintained by explosive combustion cycles in the chamber. The thermal expansion of the combustion gases drives the gases from the chamber and through the downstream elements to provide a self-exhausting operation or burner system. The burner may be arranged to provide self-feeding of fuel and combustion air using, for example, aerodynamic valves to provide a self-sustaining combustion process.

The pulse combustion process is particularly suited for driving reciprocating or oscillating mechanical elements, since the combustion process is characterized by alternating periods or cycles of higher and lower pressures or positive and negative pressure. The inherent alternation of pressures is available for driving or powering movement in each direction. As indicated, the driven element may be driven in either a reciprocating back-and-forth motion or an oscillating, rotary motion. The term "reciprocating" and variations thereof are used herein to include both types of motion unless such is clearly contrary to the context of the discussion.

The natural operation of pulse combustion to power reciprocating motion in both directions is especially efficient since the mechanical element, such as a piston, is driven on both half-cycles of the operating pressure curve of the burner. This also enables simplification of the componentry, since return "bounce" cylinders or other mechanical elements are not required. Similarly, piston movement automatically begins with combustion and it is not necessary to use a starting device to initially bias the piston as in the described prior art free piston devices.

The present invention is particularly advantageous in fluid conditioning systems which may include both liquids and gases. The invention is especially efficient in providing compressor operation for a heat pump system wherein nearly all of the energy not used in the compressor operation is recovered by heat exchange with a primary fluid. For convenience hereinafter, the invention is described with reference to a combined hot water heater and heat pump application, the latter being described with reference to the transfer of heat between indoor and outdoor air.

DETAILED DESCRIPTION OF THE DRAWINGS

Figure 1:
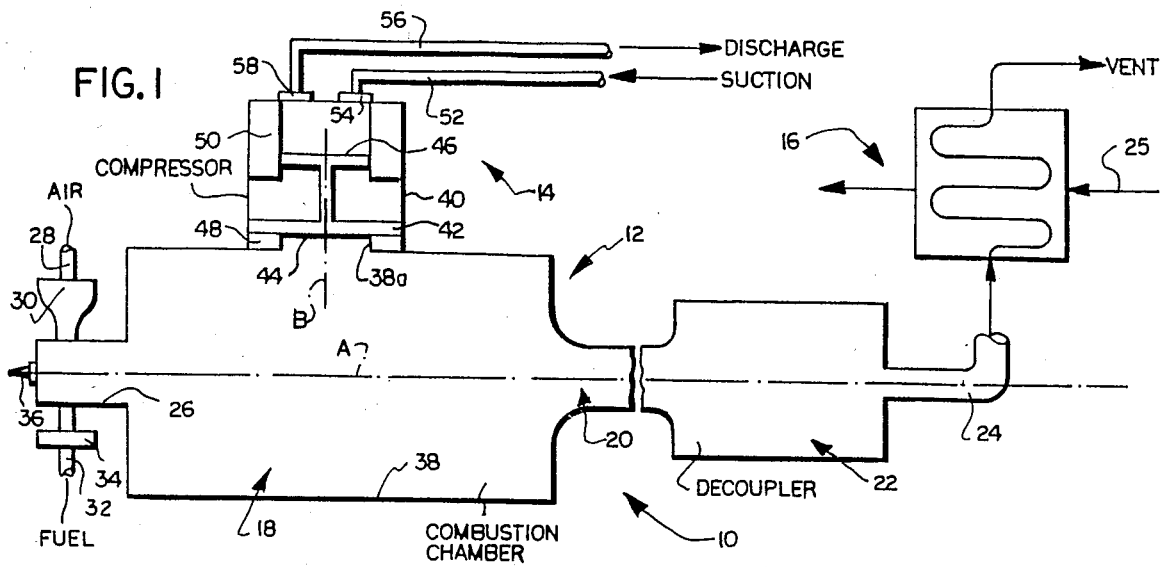
FIG. 1 is a diagrammatic showing of a pulse combustion burner apparatus used as a heat engine to drive a compressor and connected to a primary heat exchanger for transfer of engine-rejected heat to a primary fluid in accordance with the present invention.

Referring to FIG. 1, a pulse combustion powered apparatus 10 is shown for heating and pressurizing fluids. The apparatus 10 includes a pulse combustion burner 12 arranged to drive a compressor 14 and to deliver engine-rejected heat to a primary heat exchanger 16.

The major elements of the pulse combustion burner 12 include a combustion chamber 18, an exhaust pipe or tailpipe 20, and a decoupler 22. The decoupler 22 comprises a relatively large volume chamber which decouples or isolates the combustion gases passing through the burner from downstream pressure effects. It is not necessary to use a decoupler in all applications. The combustion gases are subsequently discharged from the decoupler to the atmosphere through a vent pipe 24.

For convenience herein, the primary heat exchanger 16 is shown in heat exchange relationship with the vent pipe 24. The heat exchanger 16 may actually be placed in heat exchange relationship with any of the elements of the burner 12, including the combustion chamber 18, tailpipe 20, and decoupler 22, as well as combinations thereof. The heat exchanger 16 provides indirect, conductive heat transfer between the combustion gases and a primary fluid flowing within line 25.

A mixer head 26 is mounted adjacent to one end of the combustion chamber 18 for receiving a mixture of air and fuel combustion gases. To that end, an air line 28 is arranged to deliver air, which may be provided by a starting blower, through an air valve 30 to the mixer head 26. A fuel line 32 and associated fuel valve 34 are provided for delivery of the fuel, which comprises natural gas herein, to the mixer head 26. The valves 30 and 34 can be flapper valves, as shown, or aerodynamic valves (not shown), which are responsive to fluid pressures and cooperate in the self-sustaining operation of the pulse combustion burner. A sparkplug or glow coil is provided for initially igniting the air and fuel mixture.

The combustion of the fuel and air mixture creates a positive pressure in the combustion chamber, thereby closing valves 30 and 34, forcing the combustion gases to exhaust as they advance through downstream elements of the burner. This causes the pressure in the combustion chamber 18 to decrease below atmospheric pressure so as to open the valves 30 and 34 and draw in a fresh charge of air and fuel. This fresh charge is automatically reignited by the hot gases remaining in the combustion chamber and the cycle is started once again. Once started, the burner no longer requires a starting air blower or igniter, and it operates as a self-sustaining or self-powered burner.

The frequency of the positive and negative periods of pressure may range from tens to hundreds of cycles per second. The aforementioned sequence of compressions and rarifications of the combustion gases take place at the velocity of sound within each cycle. The combustion gases from each individually ignited charge are not separately discharged for each cycle, but flow from the system at some lesser velocity.

It should be appreciated that a fuel injector (not shown) may be substituted for the fuel valve 34 in order to provide independent control of the periodic feeding of fuel and the frequency of burner operation. The combustion gases remain self-exhausting in such a modified burner.

Figure 2:
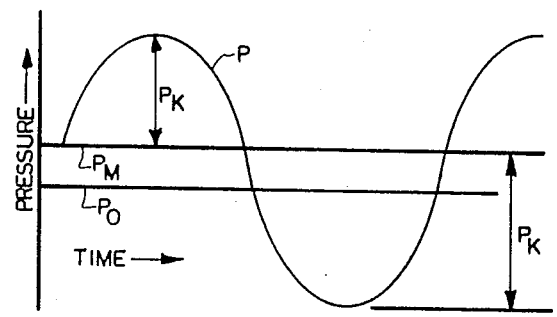
FIG. 2 is a curve showing a typical pressure regime in an operating pulse combustion burner as shown in FIG. 1.

FIG. 2 illustrates a typical pressure regime in an operating pulse combustion burner based upon an integration of the measured pressure for a predetermined time period. This technique assumes sinusoidal operation and averages instantaneous pressure values based upon the root mean square value. Accordingly, the curve corresponds with the instantaneous pressure P, and an average peak pressure $P_k$, is calculated. The peak pressure is determined relative to the mean pressure, $P_m$, for both the positive and negative cycles. Atmospheric pressure is indicated as $P_o$. The actual values of the operating pressures will depend upon the size of the burner and its particular geometry. Positive pressures as high as 2 to $2\frac{1}{2}$ atmospheres (absolute) and negative pressures as low as $\frac{1}{2}$ atmosphere have been reported.

The foregoing pressure characteristics of pulse combustion are used to drive the compressor 14 as indicated above. To that end, the combustion chamber 18 includes a wall 38 which defines a passageway having a longitudinal axis "A" which extends in a direction corresponding with the flow of combustion gases to the tailpipe 20. The compressor 14 includes a cylinder 40 which directly communicates with the combustion chamber 18 through an opening 38a in the wall 38. The compressor 14 also includes a free piston 42 mounted with a fluidtight seal within cylinder 40 for reciprocatory movement along an axis "B" of the cylinder. As shown, the axis "B" of the cylinder 40 is disposed at substantially a right angle relative to the axis "A" of the chamber 18 and the direction of flow of the combustion gases. This simplifies the apparatus by substantially avoiding obstruction of the direction of flow of the combustion gases.

It should be appreciated that the compressor cylinder 40 may be arranged in fluid communication with other portions of the burner 12. For example, the cylinder 40 may be mounted to the tailpipe 20 or decoupler 22 for direct communication with the combustion gases therein.

In the compressor 14, the piston 42 includes a driven side 44 which is in direct contact with the combustion gases and a working side 46 which is in direct contact with the fluid being pressurized or a working fluid of the compressor. The driven side 44 of the piston is entrapped within a pair of stops 48 and 50 longitudinally spaced within the cylinder 40.

The compressor 14 also includes a suction line 52 which communicates with the cylinder 40 through a one-way inlet flow valve 54. Similarly, a discharge line 56 communicates with the cylinder 40 through a one-way outlet flow valve 58.

The compressor 14 may be used to pressurize fluids in order to allow their processing as liquids as, for example, in the case of carbon dioxide. Further, the compressor 14 may simply be used to distribute a liquid such as the primary fluid which is being heated in heat exchanger 16. The cross-sectional area and stroke of the compressor piston 42 are sized to provide the required pressure and the flow capacity of the compressor.

Figure 3:
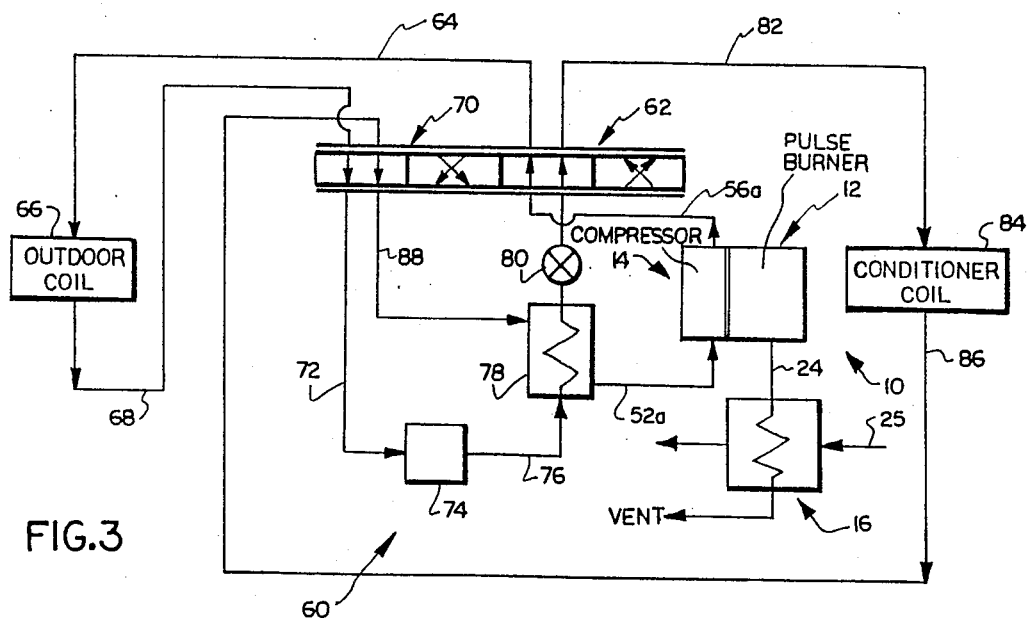
FIG. 3 is a schematic view showing the apparatus of FIG. 1 incorporated in a reversible refrigeration system.

Referring to FIG. 3, a particularly preferred application of the present invention is shown, wherein the apparatus 10 is used in a reversible refrigeration system or circuit comprising heat pump system 60. This arrangement may be used, for example, in a residential application wherein the primary heat exchanger 16 comprises the hot water heating system and the heat pump system 60 provides heating and cooling for the residence. An air-to-air design is described hereinafter in connection with a fixed air circuit. However, it is also known in the art to employ a fixed refrigerant circuit and to reverse the air circuit. Similarly, the present invention may also be incorporated in air-to water and water-to-water systems.

The compressor 14 is arranged to circulate a working fluid in the heat pump in a conventional manner to either absorb or reject heat for purposes of heating or cooling the air going into the space to be conditioned. The working fluids may comprise any one of several conventional refrigerants of the halocarbon family, such as Refrigerants-11, 12, and 22, as well as others which are known to be useful in reciprocating compressors.

The heat pump 60 is shown in the cooling mode, wherein the hot gas or vapor output of the compressor is passed via line 56a to a bidirectional valve portion 62. The valve portion 62 is arranged to direct the hot vapor via line 64 to an outdoor coil 66. The hot vapor is condensed as it passes through the coil, giving up the latent heat of condensation to the outside air. The now-liquid refrigerant passes via line 68 to bidirectional valve portion 70, which is arranged to convey the liquid through line 72 to a liquid receiver 74.

The liquid is conveyed from receiver 74 through line 76 to a heat exchanger 78 for further cooling. The liquid leaving the heat exchanger 78 is passed through an expansion valve 80 and then directed by valve portion 62 through line 82 to a conditioner coil 84. As the liquid passes through the conditioner coil 84, it is vaporized into a gas and absorbs the heat of vaporization from the air in the space to be conditioned.

The gas exiting from the coil 84 is then passed via line 86 to valve portion 70. The valve portion 70 is arranged to direct the refrigerant vapor through line 88 to heat exchanger 78. The vapor undergoes indirect heat exchange and it is withdrawn from the exchanger 78 at a higher temperature via line 52a. Thereafter, the refrigerant is drawn into the compressor 14 through the suction line to begin its cycle once again.

As shown in FIG. 3, the valve portions 62 and 70 may be arranged so as to cause the output of the compressor 14 to pass to the conditioner coil 84 for condensation and heating of the air space to be conditioned. The output of the expansion valve 80 will pass to the outdoor coil 66, where it will be evaporated in order to absorb the heat of vaporization from the outdoor air.

In either of the cooling or heating operations described above the compressor 14 is driven by the pulse combustion burner 12. More particularly, the compressor piston 42 is directly exposed to the hot combustion gases within the chamber 18 and work is done on the compressor piston during both the positive and negative half-cycles so that the effective pressure will be the root mean square (RMS) of the peak pressure $P_k$, or approximately 70% of the peak pressure. Accordingly, it is advantageous to optimize the ratio of the peak pressure to the mean pressure ($P_m$) In order to obtain the maximum work output for a given input rate or provide a desired work output level with a minimum input rate. The optimization or maximization of the peak-to-mean pressure ratio is obtained by appropriate design of the mixer head 26, combustion chamber 18, and tailpipe 20. The latter design includes tapering of the inlet and outlet of the tailpipe in known manners to provide aerodynamically smooth connections, as shown in FIG. 1, in order to reduce friction flow losses. The reduction of these friction losses has now been demonstrated to improve the peak-to-mean pressure ratio, and thereby optimize the work output of the compressor. Specifically, the $P_k/P_m$ ratio will be optimized for a given energy input rate by minimizing the combustion chamber volume and maximizing the tailpipe cross-sectional area. Through the use of such techniques, the peak-to-mean pressure ratio may be increased to values in the range of 5 to 6 and, preferably, to values in the range of 10 to 15.

Substantially all of the heat energy not used to drive the compressor 14 is transferred by the heat exchanger 16 to the primary fluid flowing through line 25. This is a result of the highly efficient heat transfer characteristics of pulse combustion. Accordingly, the cost of energy for a heat pump driven by a pulse combustion system will be substantially less than that of an electric-motor-driven heat pump due to the recovery of most of the heat energy not used in the form of work.

Figure 4:
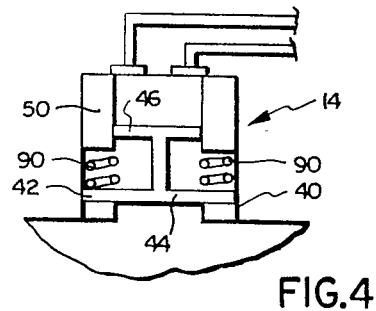
FIG. 4 is a diagrammatic view, similar to FIG. 1, of a modified compressor piston arrangement in accordance with the present invention.

Referring to FIG. 4, a modification of the compressor 14 is shown. More particularly, compression springs 90 are located intermediate the driven side 44 of the piston 42 and the stop 50 of the cylinder 40. The compression springs 90 operate to resist the compression stroke of the piston 42 and to overcome the inertia forces acting on the piston, and thereby to optimize the work output to the compressor 14 for a given peak pressure and input rate condition.

In illustration of the foregoing pumping and compressor applications, a pulse combustion burner was provided with a cylindrical combustion chamber having a length of 10 inches, a diameter of 3.25 inches, and a total combustion chamber volume of 83 in.$^3$. The tailpipe had a $\frac{3}{4}$ inch I.D. and a 6-foot length. The compressor was provided by a piston and cylinder arrangement which directly communicated with the burner combustion chamber in the same manner as shown in FIG. 1. The cylinder had an inside diameter of 3.750 inches, and the piston had an outside diameter of 3.746 inches. The overall cylinder length was 2.80 inches.

The compressor suction and discharge lines were arranged to pump water from an open reservoir to a drain. The burner was operated at an input rate of 50,000 BTU/hr. using natural gas as a fuel and pulse combustion was maintained in accordance with the natural frequency of the burner. The oscillating pressure regime within the combustion chamber had an average peak pressure $P_k$ of 25 to 35 inch water column upon variation of burner operating conditions. The water was pumped from the reservoir by the compressor at a rate of 1 to 7 lbs./min., in accordance with variation of the liquid head.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited to scope and effect to the specific embodiment herein shown and described nor in any other way that is inconsistent with the extent to which the progress in the art has been advanced by the invention.

What is claimed is:

1. A pulse combustion powered apparatus for heating and pressurizing fluids, comprising in combination a pulse combustion heat engine, compressor means, and primary heat exchange means for transferring heat rejected by the heat engine to a primary fluid to be heated, said heat engine including chamber means for pulse combustion of a fuel to provide combustion gases which have cyclic periods of positive and negative pressure, said compressor means including piston means arranged for reciprocatory motion to pressurize a fluid to provide the work output of said compressor and means drivingly interconnecting said piston means and chamber means to reciprocate said piston means in response to said positive and negative pressures of said combustion gases, said pulse combustion heat engine comprising a pulse combustion burner, said compressor means including a cylinder, said piston means comprising a piston mounted within said cylinder, said interconnecting means providing fluid communication between said chamber means and said cylinder and said compressor means being incorporated in a reversible refrigeration system arranged to exchange heat energy between first and second secondary fluids.

2. An apparatus as set forth in claim 1 wherein said pulse combustion burner includes a combustion chamber, said chamber means is the combustion chamber of said pulse combustion burner and said burner also includes a tailpipe which connects said combustion chamber to a decoupler, and a vent pipe connecting said decoupler to the atmosphere, said burner self-feeding said fuel and self-exhausting said combustion gases through said combustion chamber, tailpipe, decoupler, and vent pipe.

3. An apparatus as set forth in claim 2, wherein said tailpipe includes aerodynamically smooth connections with said combustion chamber and decoupler which reduce the friction flow losses of said combustion gases and thereby increase the ratio of the peak pressure to the mean pressure of the combustion gases.

4. An apparatus as set forth in claim 2, wherein said burner has a minimized combustion chamber volume and a maximized tailpipe cross-sectional area for a given energy input to thereby increase the ratio of the peak pressure to the mean pressure of the combustion gases.

5. A fluid heating and cooling system comprising in combination a pulse combustion heat engine, primary heat exchange means for transferring heat rejected by the heat engine to a primary fluid to be heated, and a reversible refrigeration circuit, said heat engine including chamber means for pulse combustion of a fuel to provide combustion gases which have cyclic periods of positive and negative pressure, said reversible refrigeration circuit including compressor means having piston means arranged for reciprocatory motion to pressurize and circulate a working fluid to secondary heat exchange means for transferring heat between first and second secondary fluids, said compressor means also including means for drivingly interconnecting said piston means and chamber means to reciprocate said piston means in response to said positive and negative pressures of said combustion gases.

6. A system as set forth in claim 5, wherein said interconnecting means provide fluid communication between said chamber means and said piston means.

7. A system as set forth in claim 5, wherein said pulse combustion heat engine comprises a pulse combustion burner, said compressor means includes a cylinder, said piston means comprises a piston mounted within said cylinder, and said interconnecting means provide fluid communication between said chamber means and said cylinder.

8. A system as set forth in claim 7, wherein said primary heat exchange means comprises an indirect heat exchanger arranged for conductive heat transfer between said combustion gases and said primary fluid.

9. A system as set forth in claim 8, wherein said chamber means is the combustion chamber of said pulse combustion burner.

10. A system as set forth in claim 9, wherein said chamber means defines a passageway through which said combustion gases pass in a gas flow direction and said piston reciprocates along a piston axis which extends at an angle with respect to said gas flow direction.

11. A system as set forth in claim 9, wherein said burner has a minimized combustion chamber volume and a maximized tailpipe cross-sectional area for a given energy input to thereby increase the ratio of the peak pressure to the mean pressure of the combustion gases.

12. A fluid heating and cooling system comprising in combination a pulse combustion heat engine, primary heat exchange means for transferring heat rejected by the heat engine to a primary fluid to be heated, and a heat pump system, said heat engine including chamber means for pulse combustion of a fuel to provide combustion gases which have cyclic periods of positive and negative pressure, said heat pump system including a compressor having a piston arranged for reciprocatory motion to pressurize and circulate a working fluid to secondary heat exchange means for transferring heat between first and second secondary fluids, said compressor also including means for drivingly interconnecting said piston and chamber means to reciprocate said piston in response to said positive and negative pressures of said combustion gases.

13. A system as set forth in claim 12, wherein said interconnecting means provide fluid communication between said chamber means and piston.

14. A system as set forth, in claim 13, wherein said compressor includes a cylinder opening into said chamber means and said piston is mounted in said cylinder.

15. A system as set forth in claim 14 wherein said primary fluid comprises water and said primary heat exchange means comprise an indirect heat exchanger arranged for conductive heat transfer between said combustion gases and said water.

16. A pulse combustion powered apparatus for heating and pressurizing fluids, comprising in combination a pulse combustion heat engine, compressor means, and primary heat exchange means for transferring heat rejected by the heat engine to a primary fluid to be heated, said heat engine including chamber means for pulse combustion of a fuel to provide combustion gases which have cyclic periods of positive and negative pressure, said compressor means including piston means arranged for reciprocatory motion to pressurize a fluid to provide the work output of said compressor and means drivingly interconnecting said piston means and chamber means to reciprocate said piston means in response to said positive and negative pressures of said combustion gases, said pulse combustion engine comprising a pulse combustion burner and said chamber means comprising a combustion chamber of said burner, said compressor means including a cylinder, said piston means comprising a piston mounted within said cylinder, said interconnecting means providing fluid communication between said combustion chamber and said cylinder, said compressor means being incorporated in a heat pump arranged to exchange heat between outdoor air and conditioned indoor air, said primary fluid being water, and said primary heat exchange means comprising a hot water heater.

* * * * *